Aug. 25, 1970  A. P. DE VITO  3,525,143
METHOD OF DIP SOLDERING ELECTRICAL TUBE SOCKETS
Filed March 24, 1967  2 Sheets-Sheet 2
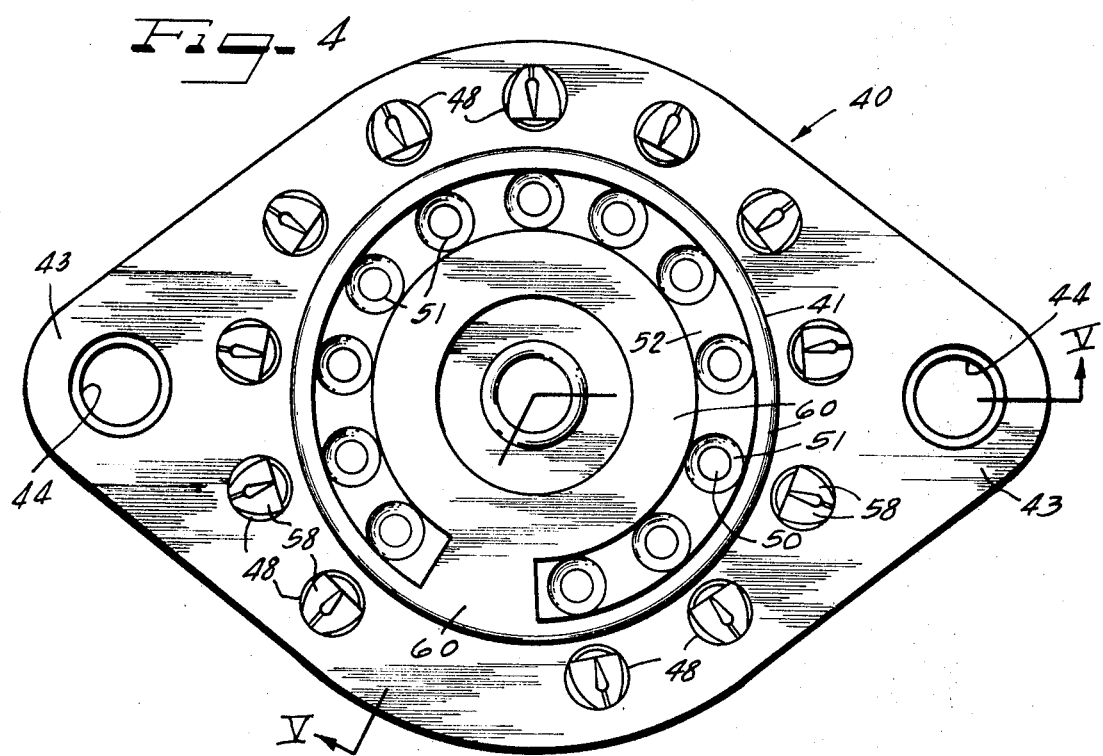
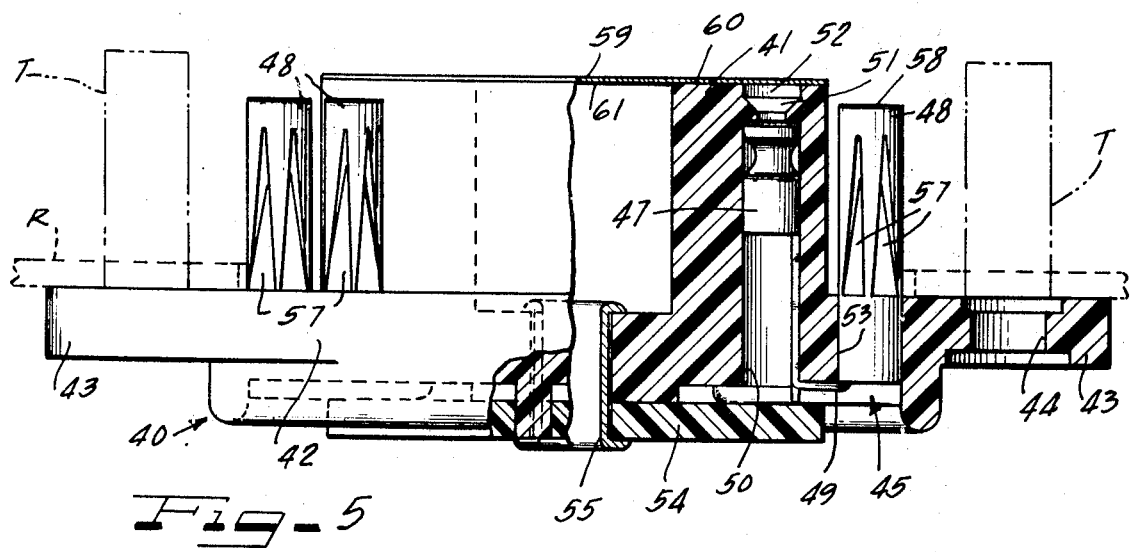
INVENTOR.
ALBERT P. DeVITO
BY  Hill, Sherman, Meroni, Gross & Simpson ATTORNEYS United States Patent Office 3,525,143
Patented Aug. 25, 1970

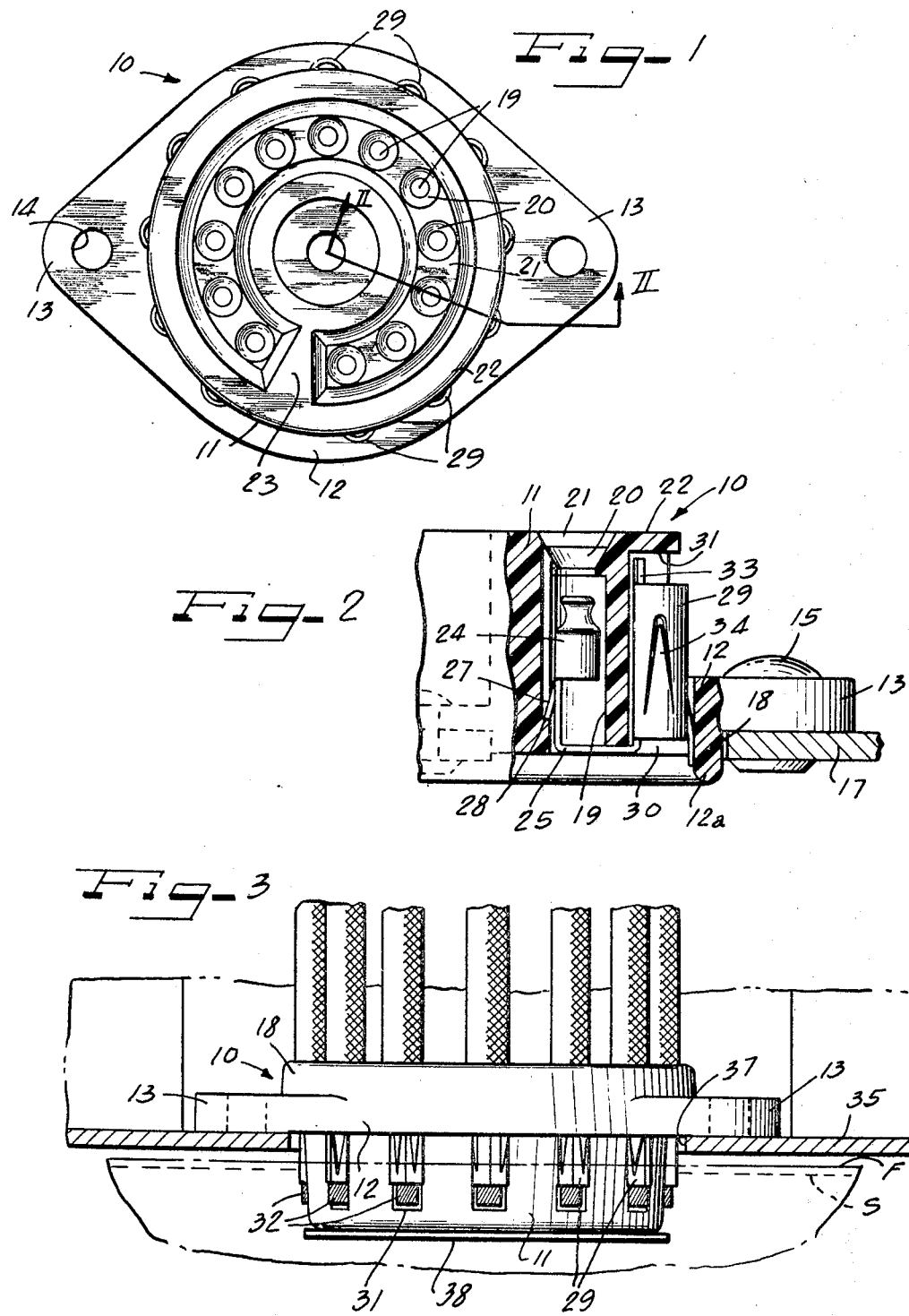

3,525,143
METHOD OF DIP SOLDERING ELECTRICAL TUBE SOCKETS
Albert P. De Vito, Niles, Ill., assignor, by mesne assignments, to Conalco Metals, Inc., a corporation of Delaware
Continuation-in-part of applications Ser. No. 459,159, May 27, 1965, and Ser. No. 569,134, Aug. 1, 1966. This application Mar. 24, 1967, Ser. No. 625,819
Int. Cl. B23k *31/02*
U.S. Cl. 29—471.1
2 Claims

ABSTRACT OF THE DISCLOSURE

A method of dip soldering electrical sockets of the multiple pin tube mounting type having solder well terminals by which electrical circuit leads are connected to the pin receptacles, the tips of the terminals lying adjacent to the plane of the crown of the tube base body. To prevent solder from entering the pin receptacles the body crown is masked by a removable disk and the body is then safely immersed in molten solder to a sufficient depth to solder the leads to the terminals.

---

This application is a continuation-in-part of my copending applications Ser. No. 459,159, filed May 27, 1965, now Pat. No. 3,311,865 and Ser. No. 569,134, filed Aug. 1, 1966, now Pat. No. 3,426,318.

This invention relates to dip soldering of electrical tube sockets, and more particularly concerns a new method of soldering the solder well terminals mounted on a multiple receptacle type of tube socket adapted to receive a maximum plurality of connector pins in minimum space on a socket body of smallest practical size.

One of the problems with sockets of this type is the attachment and soldering of lead wires to the multiplicity of receptacles. In most prior sockets this has required manual soldering of each lead wire. In those sockets employing solder well terminals, it has heretofore been deemed necessary to have awkward, bulky structures spacing the receptacles from the terminals to avoid any possibility of solder reaching the receptacle when dip soldering the terminals.

An important object of the present invention is to provide an improved method of dip soldering electrical leads in solder well terminals without soldering connected pin receiving receptacles which necessarily also descent below the molten solder level.

Another object is to dip solder the solder well terminals of electrical sockets while isolating the pin-receiving ends of the associated pin receptacles.

A further object of the invention is to provide a new method of dip soldering tube sockets of the type in which the crowns of a plurality of solder well terminals are located within the plane of the tube base crown of the dielectric body which supports the combination electrical terminal and pin receptacle members of the socket assembly.

Other objects, features and advantages of the present invention will be readily apparent from the following detailed description of certain preferred embodiments thereof taken in conjunction with the accompanying drawings, in which:

FIG. 1 is a top plan view of a socket structure of the type with which the present invention is concerned;

FIG. 2 is a fragmentary sectional elevational detail view taken substantially along the line II—II of FIG. 1;

FIG. 3 is an inverted side elevational view of the socket structure, demonstrating the simultaneous soldering of all leads in the solder well terminals of all of the connectors, according to the method of the present invention;

FIG. 4 is a top plan view of another socket structure which is especially adapted for dip soldering according to the method of the present invention, and FIG. 5 is a sectional elevational detail view taken substantially along the line V—V of FIG. 4.

Having reference to FIGS. 1 and 2, a representative electrical tube socket 10 comprises a molded or cast dielectric body 11 which is of desirably generally circular, thick disk-like form having thereabout a radial outwardly extending mounting flange 12 located adjacent to one end of the body 11 and substantially spaced from the opposite end of the body. Each of a pair of oppositely extending attachment ears 13 on the flange 12 has a suitable aperture 14 theretherethrough receptive of an attaching rivet or the like 15 for securing the socket assembly to a supporting base such as a chassis panel 17. On this mounting panel, the socket assembly 10 has its front or top face accessibly disposed, while the rear or lower face thereof is accessible from the opposite face of the mounting panel which desirably has a clearance aperture 18 therethrough receptive of an annular flange 18 extending axially from the flange 12.

For receiving the connector pins of a multi-pin electrical device such as electrical plug connectors, electron tubes, and the like, the body 11 has a suitable number of pin-receiving bores 19 extending in an axial direction therethrough spaced inwardly from the perimeter of, and located in a circle concentric with the center of, the body. In the illustrated instance, there are twelve of the pin bores 19. To facilitate alignment of electrical connector or tube socket pins with the pin socket bores 19, the front or entry end of each bore has a flaring mouth, outwardly opening, lead-in annular cam surface 20. The individual lead-in surfaces 20 open into a generally annular groove 21 recessed in the front or tube base end face of the body 11 providing a plane surface 22. The side walls defining the groove 21 slope inwardly to afford lead-in cam surfaces directed toward the lead-in surfaces 20. Between two of the lead-in mouths 20 there is an orientation land 23 which extends entirely across the groove 21 and joins the areas of the surface 22 at both sides of the groove.

Within each of the pin bores 19 is a respective generally tubular electrically engageable receptacle 24 having its frictional pin-gripping necked flaring mouth front end portion suitably adjacent to the inner end of the associated lead-in surface 20, and its back end substantially spaced from the back end of the pin bore 19. Mounting of the receptacle 24 is effected by inserting it through the back end of its pin bore, with an angular, generally L-shaped tail piece 25 integral with the back end of the receptacle defining the front end orientation of the receptacle to the lead-in 20, by engagement of the laterally extending portion of the tail piece against the back end face of the body 11. Retention of the receptacle 24 against rearward displacement is effected by means of a longitudinally stiff but laterally resiliently flexible detent finger 27 extending from the rear end of the receptacle and engaging with a forwardly facing stop shoulder 28 adjacent to the back end of the bore.

For attachment of electrical leads to the respective receptacles 24, each of them is provided with an integral tubular solder well terminal 29 joined thereto by means of the tail piece 25. This provides a generally U-shaped unit on which the receptacle 24 and the terminal 29, in each instance extend in the same direction and have their free ends adjacent to one another but separated by the material of the body forming the wall of the associated pin bore 19.

3

In this instance, mounting of the terminal 29 is within a bore 30 located radially outwardly in paired alignment with the associated pin bore 19 and extending at least partially through the lateral flange 12 and inwardly adjacent to the axial flange 18. In the particular illustrated embodiment of the socket, the terminal bore 30 is also partially in the body 11 and opens outwardly from the perimeter of the bore along the length of the bore forwardly from the lateral flange 12 whereby a substantial front end portion of the terminal 29 is exposed at the outer perimeter of the socket body, as best seen in FIG. 1, although also apparent in FIG. 2. It will be observed that the crown end of the terminal 29 is spaced from an overhanging shoulder 31 on the body 11 and affording a substantial access opening to the crown of the terminal. This shoulder 31 provides a positive stop for the tip ends of associated leads 32 (FIG. 3) which are thus exposed in the gap between the crown of the connector and the shoulder 31 and extend along a respective solder lug 33 which projects from the solder well connector. Respective struck-in retaining prongs 34 on the solder well connectors retain the leads against withdrawal from the solder well at least until soldering has been completed.

Soldering of all of the leads 32 to their solder well connectors 29 is effected simultaneously by simply dipping the front end portion of the body 11 into a body of molten solder S as schematically shown in FIG. 3. By having the solder at a constant level under a suitable gaging fixture member 35 having a dip hole 37 of an opening size just large enough to afford ample clearance for easy projection therethrough of the socket assembly forwardly from the lateral flange 12, simultaneous soldering of all of the leads to the connectors is effected by the simple maneuver of inverting the socket assembly 10 with or without the leads 32 in place and inserting the front end portion through the dip hole 37. The depth of the dipping is gaged by engagement of the flange 12 and more particularly the ears 13 against the gaging member 35.

To prevent solder from entering the pin bores 19 and possibly blocking the mouth ends of the receptacles 24, a masking disk 38 is applied reasonably firmly onto and across the front face of the body 11 onto the surface 22 to close the groove 21. Operative retention of the masking disk 38 may be effected in any suitable readily releasable manner such as by frictional retaining clip or plug structure, pressure sensitive adhesive, and the like, as may be preferred. This enables quick attachment and removal, but effectively precludes entrance of solder to the receptacles 24 even though the forward portion of the body 11 extends to a substantial distance into the solder in order to attain thorough immersion of the end portions of the solder wells 29 and the associated leads 32 for effective soldering.

Where the leads 32 are preassembled with the socket 10 before soldering, a virtually instantaneous dip into the molten solder S enables the solder to flow into coating engagement with the terminals 29 and the leads 32, the solder lugs 33 and into the terminal side wall openings from which the prongs 34 have been struck, affording complete access by the solder to the leads within the terminals, as well as those portions of the terminals which project beyond the ends of the terminals. If preferred, of course, the socket assembly 10 may be mounted in the dipping position on the dip gage 35 and the leads then assembled into the selected solder well terminals 29. However, the preassembled relationship is generally preferred.

Desirably, the solder bath S has floating thereon suitable molten flux F so that the flux coats the parts to be soldered incident to insertion thereof through the flux into the solder bath. As the socket 10 is withdrawn from the solder bath, it is self-draining, so that minimum effective solder is used in the soldering process.

Although as shown in FIG. 3, the socket 10 is not mounted on the supporting panel 17, it should be understood that the dip soldering method described is adapted to be practiced with the socket already mounted on the supporting chassis panel 17, if desired.

In FIGS. 4 and 5 is shown a modification which is included herein because it represents a further commercial form of the invention. It comprises a tube socket assembly 40 including a cast or molded dielectric body 41 of substantial thickness and preferably cylindrical form having about one end portion thereof a radially extending mounting flange 42 which is substantially thinner than the body and spaced from the opposite or front or upper end of the body and includes a pair of oppositely extending attachment ears 43. For attaching the socket 40 to the supporting base such as a chassis panel R, the ears 43 have respective apertures 44 therethrough receptive of suitable means such as respective rivets, combination attachment pin terminals T, or the like.

Respective generally U-shaped formed sheet metal combination receptacle and solder well units 45 are carried in assembly with the body 41. Each of the units 45 includes a pin-receiving receptacle 47 and a solder well terminal 48 integrally connected by a connecting strip or tail piece 49, providing an electrically continuous conducting structure. To receive a plurality, such as twelve, of the receptacle-terminal units 45, the body 41 has an annular series of bores 50 opening through its opposite ends adjacent to its outer perimeter and with the pin-receiving mouth ends of the receptacle adjacent to inwardly tapered entry openings 51 at the upper or outer end of the body as viewed in FIG. 5, with a generally annular groove 52 recessed in such end in alignment with the bore openings and facilitating reception of the pins of an electrical connector, electronic tube, or the like, into the receptacle 47.

To mount the terminals 48, complementary bores 53 are provided in the flange 42 in equal number to the receptacle bores 50 and disposed in an annular series spaced radially outwardly from and aligned in paired relation with the receptacle bores. The relationship of parts is such that when fully assembled with the body 41, the units 11 have the mouth or receiving end of the receptacles 47 adjacent to the respective access openings 51, and the distal end of the associated terminals 48 adjacent to but desirably spaced from the top of crown end of the body 41 so as to avoid interference with a possibly overhanging base portion of an electronic tube or connector mounted on the socket with its terminal pins engaged in the respective receptable 47.

An electrical leakage preventing and retainer disk 54 is attached in opposition to the tail piece 49 as by means of a tubular rivet 55.

Electrical leads are readily inserted into the tubular solder well terminals 48 by inserting the ends of the leads into the base and openings and thrusting them inwardly longitudinally into the terminals. The leads are therein gripped by convergently related retaining prongs 57 having their tips directed toward lead-stopping crown flanges 58 on the terminals.

After the leads have been inserted into respective solder well terminals 48, they are adapted to be soldered thereto by dip soldering the socket assembly substantially in the same manner as described in connection with FIG. 3, whereby all of the solder well terminals receive solder simultaneously.

In order to avoid entry of solder into the pin receptacles 47 which must be maintained free for entry of tube pins, connector prongs or plugs, and the like, a masking member or disk 59 is removably attached to the crown of the body 41 which has a plane surface 60 about the groove 52 both at its inner and outer diameters. Thereby solder is completely precluded from access to the receptacles 47 even though the body 41 is dipped to a substantial depth into a solder bath in order to effect thorough entry of solder into the solder well terminals 48.

In a desirable construction, the masking member disk 60 is a piece of suitable material such as masking tape having a pressure sensitive adhesive coating 61 on one face and by which the masking disk is effectively adhesively removably press-attached to the body crown surface 60. In practice, the socket assembly 40 is manufactured and supplied to the user with masking disk 59 in place. After dip soldering has been effected, the masking disk 59 is easily stripped from the crown 60 to expose the crown and the groove 52 for reception within the receptacles 47 of pins of a member seated on the crown 60 as a base.

It will be understood that variations and modifications may be effected without departing from the spirit and scope of the novel concepts of this invention.

I claim as my invention:

1. A method of dip soldering to fasten leads in all of a plurality of electrical solder well terminals simultaneously, where the socket has a dielectric body portion of substantial length and diameter provided adjacent to one end thereof with a laterally outwardly extending mounting flange through which said solder well terminals extend with openings therefrom to receive the leads at one end of the body and with crown portions of the terminals adjacent to the opposite end of the body which provides a crown and with substantial lengths of the terminals extending beyond a face of said flange which faces in the same direction as said crown, said terminals having pin-receiving receptacles electrically connected thereto and mounted in openings in said body which have entrances through said crown for receiving tube pins into the receptacles, the method comprising:

closing said entrances to the openings against entry of solder thereinto; dipping the crown end portion of said body and the adjacent portions of said terminals into a bath of molten solder to a depth sufficient to solder said leads in said terminals while entry of solder to said receptacles is precluded by virtue of the closing of said entries into the openings; and gauging the depth to which said body and adjacent portion of the terminals are dipped into said bath of solder by resting said face of said flange against a fixed gauging member spaced above the top of the molten solder.

2. A method according to claim 1, in which said gauging member has a dip hole therethrough just large enough to afford ample clearance to receive the socket body and the terminals, and the socket body and terminals are projected through said opening until said face of the flange engages the gauging member.

References Cited

UNITED STATES PATENTS

| | | | |
|---|---|---|---|
| 2,861,911 | 11/1958 | Martin et al. | 339—178 XR |
| 3,099,508 | 7/1963 | Schlee | 339—275 XR |
| 3,152,388 | 10/1964 | Grossman | 339—17 XR |
| 3,230,297 | 1/1966 | Means | 339—275 XR |
| 3,277,566 | 10/1966 | Christensen | 29—488 XR |
| 3,283,288 | 11/1966 | Biba et al. | 339—275 XR |
| 379,692 | 3/1888 | Elliot | 33—126 |
| 1,354,788 | 10/1920 | Wallace | 33—126 |
| 2,877,731 | 3/1959 | Allen | 228—39 XR |
| Re. 26,422 | 7/1968 | Stade et al. | 33—126 |

OTHER REFERENCES

"Solder Mask Process," I.B.M. Technical Disclosure Bulletin, vol. 4, No. 2, July 1961, page 9.

JOHN F. CAMPBELL, Primary Examiner

R. B. LAZARUS, Assistant Examiner

U.S. Cl. X.R.

29—488; 228—56.5, 39, 56